United States Patent [19]

Stobb

[11] 4,018,351
[45] Apr. 19, 1977

[54] APPARATUS FOR HANDLING BUNDLES OF SHEETS

[75] Inventor: Walter John Stobb, Pittstown, N.J.

[73] Assignee: Stobb, Inc., Clinton, N.J.

[22] Filed: Mar. 4, 1976

[21] Appl. No.: 663,825

[52] U.S. Cl. .................................. 214/314; 193/36; 198/436; 214/8.5 SS; 271/3.1

[51] Int. Cl.² ........................................ B21C 47/24

[58] Field of Search .......... 214/309, 310, 6 C, 314, 214/312, 1 Q, 300, 8.5 A, 8.5 K, 8.5 SS; 271/3.1; 198/411–413, 491, 433, 436, 445, 451, 571, 572, 596, 525, 531; 221/DIG. 1, 174; 193/35, 36

[56] References Cited

UNITED STATES PATENTS

| | | | |
|---|---|---|---|
| 1,781,424 | 11/1930 | Anderson | 198/367 |
| 2,956,381 | 10/1960 | Chauvin et al. | 214/6 C |
| 3,075,652 | 1/1963 | McCoy | 214/8.5 A |
| 3,160,259 | 12/1964 | Dalton | 198/457 |
| 3,339,692 | 9/1967 | Zipser et al. | 193/36 |
| 3,463,410 | 8/1969 | Carpenter | 214/1 Q |
| 3,710,917 | 1/1973 | Black et al. | 193/35 MD |

*Primary Examiner*—Lawrence J. Oresky
*Attorney, Agent, or Firm*—Arthur J. Hansmann

[57] ABSTRACT

Apparatus for handling bundles of sheets and having a pivotal pallet holder which receives the pallet and bundles of sheets in a prone position and which tips them to an upstanding position and onto a conveyor adjacent the holder. The upstanding bundles of sheets are then directed along the conveyor and to selected ones of a plurality of branch conveyors leading to a signature feeder or the like.

7 Claims, 8 Drawing Figures

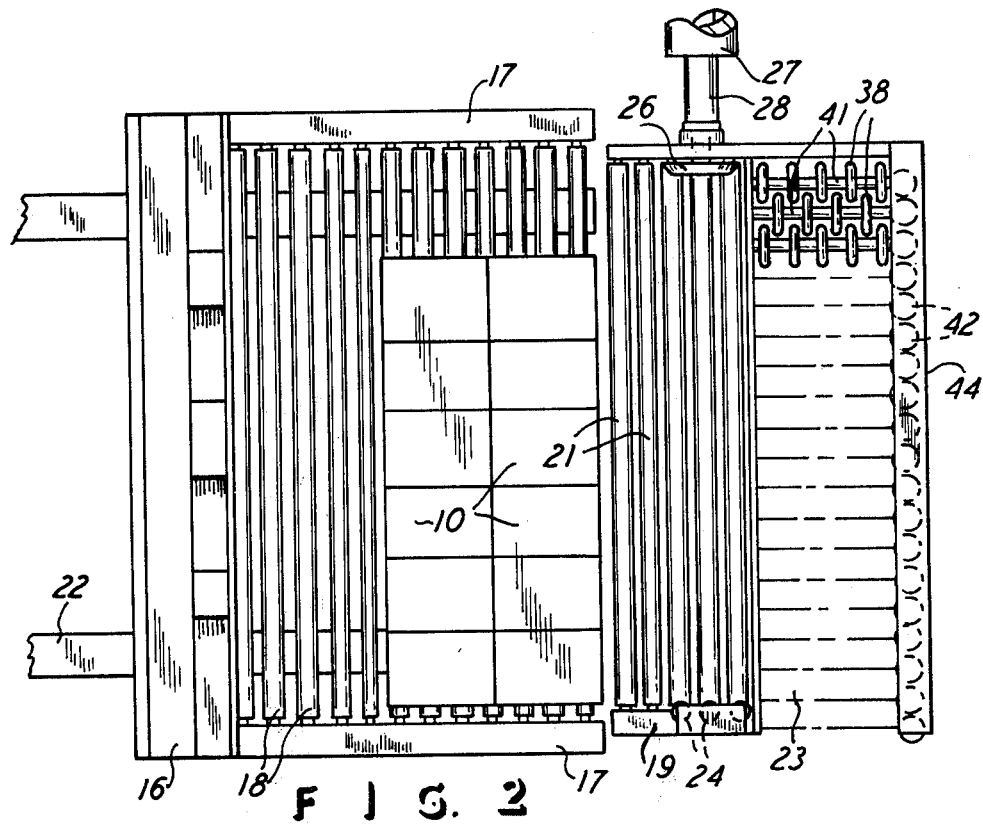
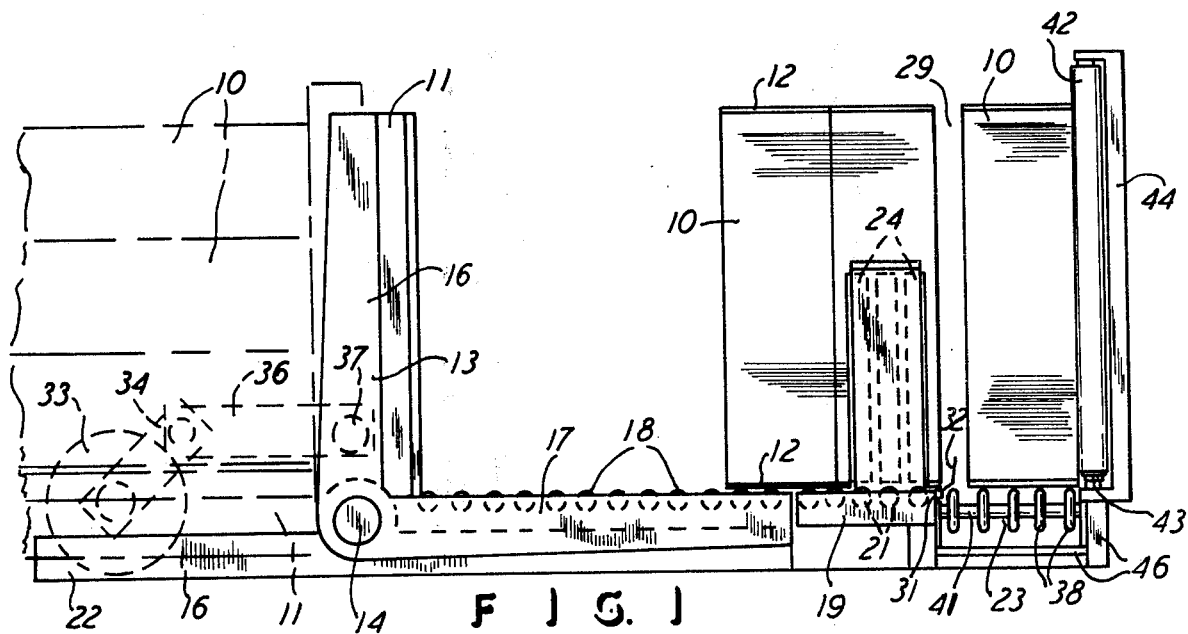

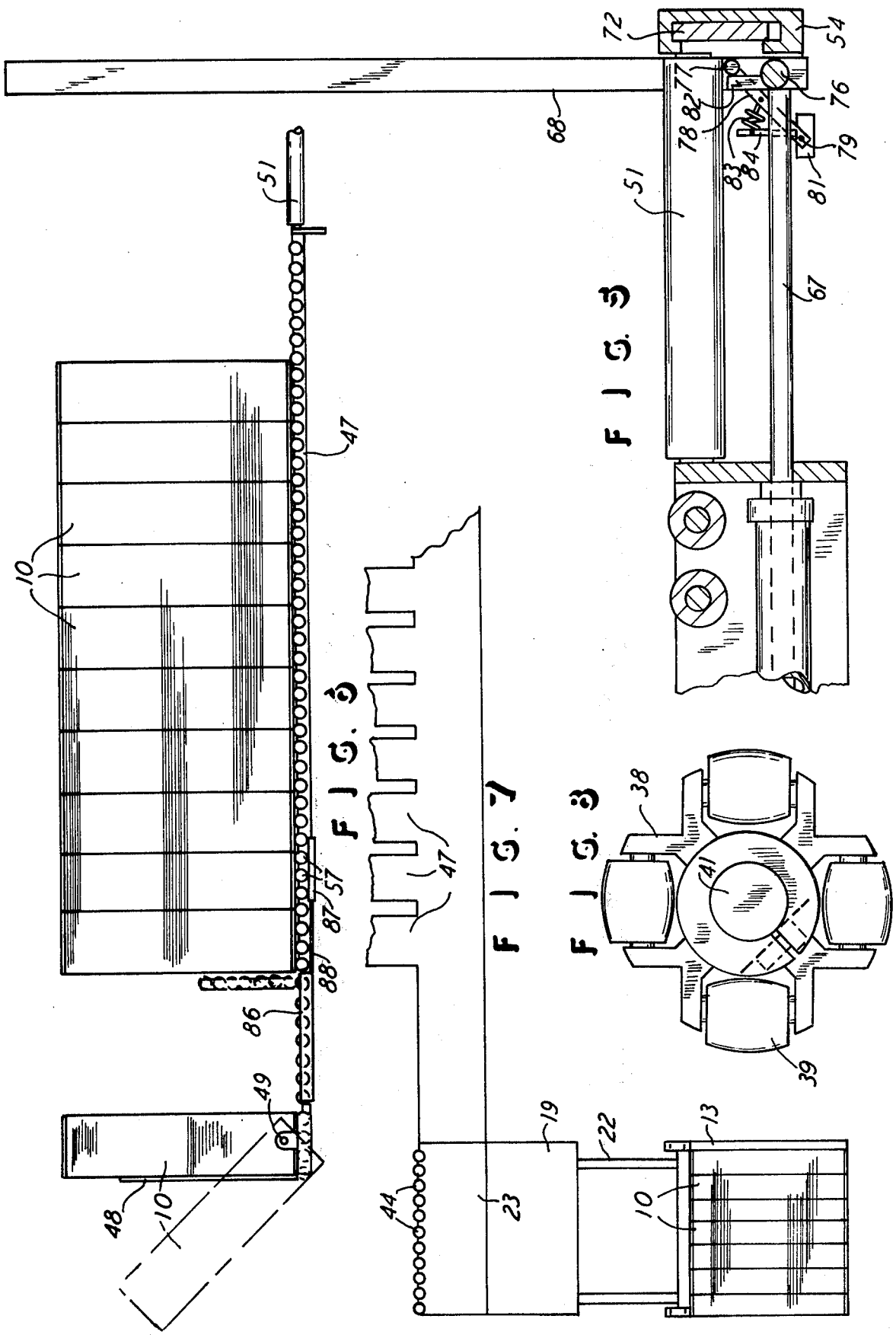

APPARATUS FOR HANDLING BUNDLES OF SHEETS

This invention relates to an apparatus for handling bundles of sheets, and it is particularly applicable to the handling of bundles of sheets in the graphic arts industry where the sheets come from a stacker and a bundler and are passed to a signature feeder, and the present invention concerns itself with the handling and transportation of the bundles of sheets from the stacker and to the signature feeder.

BACKGROUND OF THE INVENTION

In the prior art, it is common practice to receive printed sheets in a stacker and to thereby dispose the sheets in a stack and to tie them into a bundle of sheets. The bundle is then commonly transported to a signature feeder where the sheets are removed from the bundle and are disposed in the feeder in single form. Prior art disclosures showing generally the handling of bundles of sheets coming from a stacker are found in U.S. Pat. Nos. 3,739,924 and 3,825,134 and 3,853,234, and also U.S. Pat. No. 3,717,075 simply shows the formation of a stack of sheets and the movement of that stack along a conveyor.

The aforementioned prior art does not disclose apparatus or method for handling a pallet with bundles of sheets disposed thereon in a prone position and tipping the pallet and the bundles to an upstanding position and then supporting and moving the bundles along a conveyor and to selected dispensing stations located at various signature feeders which are commonly known in the art. That is, this particular invention is concerned with receiving the bundles from the prior art type of stacker and bundler and taking those bundles from a prone position on a pallet and standing them upright and moving them along conveyors to where the bundles are finally positioned in a signature feeder.

In accomplishing the aforementioned objectives of this invention, the present invention provides apparatus for efficiently and automatically handling the bundles, and the operator of the apparatus is not required to lift any of the bundles, and the bundles can therefore be heavy and large and no special lift truck or the like is required once the bundles are placed on the tiltable pallet holder which converts the bundles stable prone position to an upstanding position where the bundles are then under the control of a conveyor which permits selective dispensing of the individual bundles to the individual signature feeders. In further accomplishing these objectives, the apparatus of this invention is such that the handling of the bundles is completely automated and powered apparatus is utilized for positioning the bundles in the upright position and for moving them along a conveyor and for taking them out of their closely stacked position in rows of bundles and taking one row at a time along a conveyor and thereby obtaining control of an individual bundle which can be directed to a selected signature feeder, all without requiring that the operator lift the bundles or maneuver a lift truck or any such manual action. Accordingly, with the apparatus of this invention, the operator only needs to control switches and the like, such as by pushing the necessary switch buttons, and the bundles are completely controlled from the initial prone position on the pallet and through the movement to the upstanding position and along the several conveyors disclosed herein and to the final position at the signature feeders.

Other objects and advantages will become apparent upon reading the following description in light of the accompanying drawings.

BRIEF DESCRIPTION OF THE DRAWINGS

FIG. 1 is a side elevational view of certain of the apparatus of this invention, and with the pallet and bundles shown in the prone position in dot-dash lines.

FIG. 2 is a top plan view of FIG. 1.

FIGS. 3, 4, and 5 are top and end and side, respectively, views of portions of the conveyor adjacent the pallet holder of FIG. 1.

FIG. 6 is a side elevational view of the conveyor and the apparatus adjacent a signature feeder (not shown).

FIG. 7 is a top plan diagrammatic view of the arrangement of the apparatus of this invention.

FIG. 8 is an end elevational view of one portion of the conveyor adjacent the pallet holder of FIG. 1.

DETAILED DESCRIPTION OF THE PREFERRED EMBODIMENT

Figure 3:
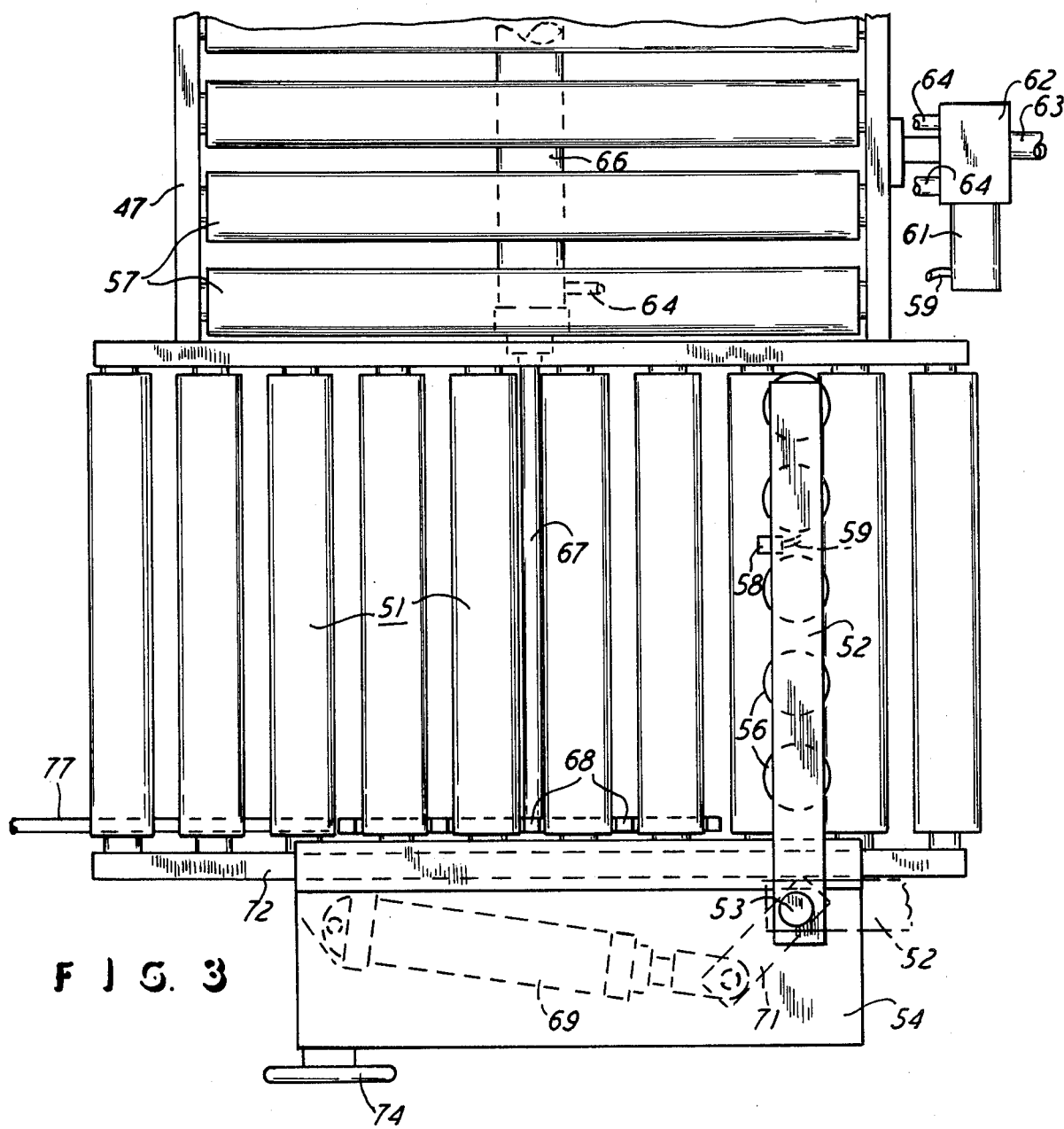

The apparatus there at is disclosed in the drawings herein, and the description of the apparatus will also be utilized for describing the method itself such that understanding the apparatus and the herein-presented description will result in a full and clear description of the method of using this invention.

FIG. 1 shows some of the apparatus of this invention, and it will here be seen that a plurality of bundles of sheets 10 are initially disposed in the prone position, as shown by the dot-dash lines on the left in FIG. 1, and a conventional type of pallet 11 is also shown in the prone position and underneath the horizontally-disposed bundles of sheets 10. It will be further understood by one skilled in the art that the pallet 11 with the bundles 10 laying thereon is brought to the position shown in FIG. 1 by a lift truck fork, if that be desired, and the bundles of course have been formed by a stacker and bundle tier and the bundles are therefore securely tied and have end boards 12 at the opposite ends thereof, all in a conventional and well known manner. A pallet holder 13 is pivotally disposed on a shaft 14 and it has a leg 16 and a leg 17 and the two legs are shown to be at substantially a right angle to each other. Initially the leg 16 is in the horizontal position shown by the dot-dash lines, and the pallet 11 with the bundles 10 is placed on the leg 16, and the pallet holder 13 is then pivoted to the full line position shown in FIG. 1 so that the pallet 11 is now in the upstanding position, and the bundles 10 are also in the upstanding position through they are shown moved to the right as viewed in FIG. 1. That is, the holder arm 17 is shown to have anti-friction members in the form of rollers 18 mounted along the arm 17, and the rollers 18 thus upwardly support the bundles of sheets 10 when the pallet holder is moved to the full line position shown in FIG. 1. The bundles 10 can then move along the rollers 18 and to the conveyor 19 which is disposed adjacent the pallet holder and just clear of the pivotal end of the pivoting pallet holder 13. The rollers 18, and rollers 21 on the conveyor 19, are all preferably disposed at a declining angle from the relationship of say the pallet holder pivot shaft 14 such that the rollers 18 and 21 decline one or two degrees relative to the horizontal and downwardly to the right, as viewed in FIG. 1, and thus the bundles 10 freely and automatically, under the force of gravity, move to the positions shown in FIG. 1. It will also be understood that there is an assembly of rows of bundles 10, as shown in FIG. 2 where two rows are shown on the end of the pallet holder leg 17. FIGS. 1 and 2 also show that there is sufficient and adequate framing, such as by the members 22, for the support of the pallet holder 13 and the conveyor members described herein.

An extension of the conveyor 19, or a second conveyor or branch of the first conveyor is designated 23 and extends immediately adjacent the conveyor 19 and is in bundle-flow communication with the conveyor 19 so that the bundles 10 can move from the conveyor 19 and onto the conveyor 23, as shown with respect to the bundles 10 on the extreme right in FIG. 1. Actually an entire row of the say six bundles in the row as shown in FIG. 2 is moved onto the conveyor 23 while the remainder of the bundles 10 is held on the conveyor 19. To accomplish this, a bundle row clamp or restraining mechanism is employed, and it is in the form of the several rollers 24 which extend upwardly from one side of the conveyor 19 and which align with a row of the bundles 10, as shown in FIG. 1. Then a clamp or piston member 26 is moved toward the other end of the row of bundles 10 by means of a cylinder assembly having a fluid cylinder 27 and a piston rod 28 suitably attached to the wide clamp member 26, as seen in FIG. 2. Thus, suitably advancing the clamp member 26 toward the end of the row of bundles 10 will hold the first row of bundles 10 between the member 26 and the upstanding rollers 24, and this permits separation of the rows of bundles 10 so that a space 29 is provided between successive rows of bundles 10 and thus a single row of bundles 10 can freely move to the conveyor 23, all as seen in FIG. 1. Further, a conventional type of switch 31 is suitably mounted in the path of movement of the bundles 10 to thus sense the movement of the bundles 10 to the location of the switch 31, and the switch 31 can be arranged with suitable conncecting lines 32 which in turn connect with controls for the cylinder assembly of the cylinder 27 and rod 28 to thus actuate the assembly in response to the physical position of the row of bundles 10 relative to the switch 31, all in a conventional arrangement of a limit-type switch responsive to the movement of an object into contact with the switch, and this arrangement is also similar to that hereinafter described in connection with FIG. 3.

FIG. 1 also shows that the pallet holder 13 is pivoted under the influence of powered mechanism in order to position the bundles 10 in the upstanding position described. To this end, a motor 33 having an arm 34 extending therefrom and to a link 36 is connected by a shaft 37 to the pallet arm 16. Therefore, operation of the motor 33 will pivot its arm 34 and move the link 36 to thus pivot the holder 13 about its pivot shaft 14, and this movement is through substantially a right angle, as shown and as described herein.

With a row of bundles of sheets 10 on the conveyor 23, the row is moved along its length and thus the conveyor 23 directs the bundles in a direction transverse to their movement along the rollers 18 and 21. Accordingly, the conveyor 23 has a conventional type of omniwheels 38 which support the bundles 10 and which provide for anti-friction members and movement of the bundles 10 in the direction away from the conveyor 19 and also in the direction transverse to the movement of the bundles along the conveyor 19. That is, FIG. 8 shows the omniwheel 38, and it will here be seen that each wheel 38 has four rollers 39 rotatably supported thereon, and the wheel is supported on a shaft 41 which extends in the direction shown in FIG. 1. Thus, when the bundles 10 are continuing to move over the conveyor 23 but in the direction of movement that they had relative to the conveyor 19, then the bundles are simply moving along the rollers 39 which rotate and prevent the anti-friction movement described. However, when the bundles 10 move along the length conveyor 23, then the shaft 41 can rotate and again the anti-friction support is provided for the bundles 10. Further, the conveyor 23 has upstanding rollers 42 against which the bundles 10 are supported and resting, and the rollers 42 can be suitably powered and driven, such as through a drive member 43 on the lower end of the rollers 42. With this arrangement, the row of bundles 10 will move along the length of the conveyor 23. A frame 44 suitably rotatably supports the rollers 42, and frame members 46 suitably support the remainder of the conveyor 23. FIG. 2 shows a plurality of the rollers 42 and of the omniwheel shafts 41, and it will therefore be understood that the conveyor 23 extends for any desired distance from the location of the conveyor 19 and the pallet holder 13. For instance, FIG. 7 shows a diagrammatic arrangement of the layout, and it will here be seen that the bundles 10 are initially in the prone position on the pallet holder 13, and the bundles are then to be tipped to the upstanding position and moved to the location of the conveyor 23 and against the rollers 44, as described. FIG. 7 then further shows that the conveyor 23 extends for any desired length, and it has a plurality of branches designated 47 which are in flow communication with the conveyor extent 23 so that the bundles 10 can be diverted or dispensed along the branches 47 and to the signature feeders (not shown).

Throughout this arrangement, all of the anti-friction members which are actually constituting the portions of the conveyors described are at a declining angle of one to three or so degrees with respect to the horizontal so that the bundles will move under force of gravity or at least freely along the path described and through the branches 47, one of which is also shown in FIG. 6 where a collection of the bundles 10 is shown and awaiting movement into the signature feeder apparatus 48 which is suitably pivotally mounted on a shaft 49 to tip the bundle 10 into the unshown signature feeder, all in a conventional arrangement at that point with regard to the signature feeder apparatus 49. That is, FIG. 6 shows the accumulation and storage of a number of bundles 10 which await their turn for movement into the signature feeder apparatus 48, as more fully described hereinafter.

Figure 4:
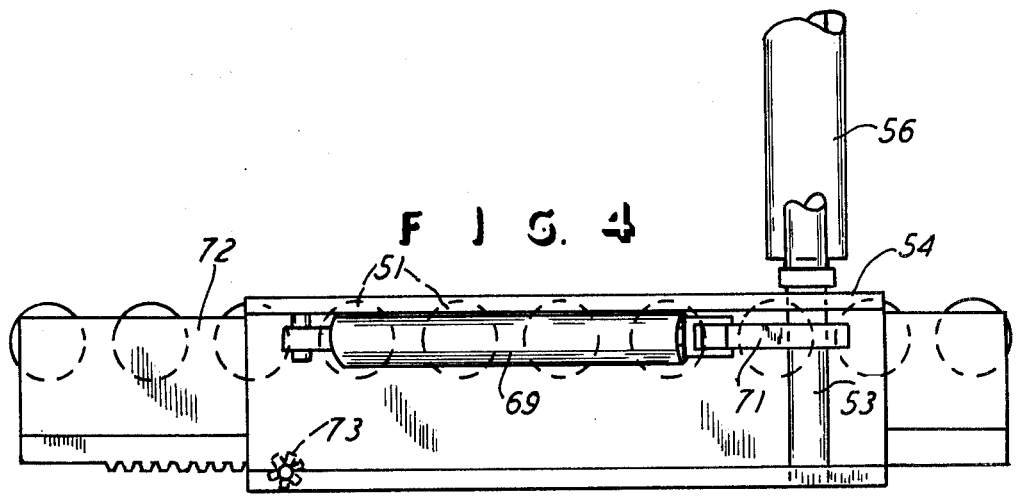

FIGS. 3, 4, and 5 show the extension of the conveyor 23, and it will here be seen that anti-friction members in the form of rollers 51 are horizontally disposed to support the bundles 10 moving along conveyor 23 and of course at the declining angle described. The first row of bundles 10 is then moving along the rollers 51 and up to the location on the conveyor 23 as shown in FIGS. 3, 4, and 5, and that location is adjacent a stop or gate 52 which is pivotally mounted on a shaft 53 suitably supported adjacent the conveyor 23, such as in a frame member 54 as shown. The gate 52 has rollers 56 uprightly disposed thereon, and the gate swings between the full line and closed position shown in FIGS. 3 and 4 and to the dot-dash line which is the open position fragmentarily shown in FIG. 3. Of course in the solid line or gate closed position of FIG. 3, the first bundle 10 in the row moving along the rollers 51 will engage the gate 52 and be stopped thereby and the first bundle can then be diverted onto the branch 47, as mentioned. Branch 47 is shown to have anti-friction members in the form of rollers 57 horizontally disposed therealong and at the declining angle mentioned so that the bundles can move to the signature feeder apparatus 48, as indicated in FIG. 6.

When the first bundle 10 engages the closed gate 52, it also engages a limit switch 58 of a conventional design, and, through a connecting line 59, the switch 58 is connected to apparatus, such as a solenoid 61 which in turn controls an air valve 62 having an incoming air line 63 and two outlet air lines 64. Thus the valve 62 responds to the contact by the first bundle with the switch 58, and the valve 62 controls a fluid cylinder assembly 66 suitably mounted underneath the conveyor 47. The assembly 66 has a cylinder rod 67 which extends to the far side of the conveyor branch 23 and the extending end of the rod 67 is suitably attached to upstanding fingers 68 which extend upwardly between the rollers 51, and FIG. 5 also shows the upstanding fingers 68. Therefore, when the first bundle arrives at the area which is now designated adjacent the fingers 68, the cylinder assembly 66 is actuated and will actually retract the rod 67 to move the fingers 68 toward the conveyor 47 and thus pull the first bundle 10 onto the conveyor 47.

FIGS. 3 and 4 also show that another fluid cylinder assembly 69 is mounted on the side of the conveyor extension 23, and the assembly 69 connects with an arm 71 which in turn is connected with the gate shaft 53 to thereby rotate the shaft 53 which has the gate 52 affixed thereto and thus the gate 52 is pivoted between the solid line and the dot-dash lines shown. Accordingly, the operator can control the actuation of the assembly 69 to thus swing the gate between the open and closed positions and thereby distribute the bundles 10 to the branches 47, as desired. Also, the gate 52 and the attending parts such as the shaft 53 and the cylinder assembly 69 are all mounted on the frame piece 54 which is movable along the length of the conveyor 23 by means of having a rack 72 and a pinion 73, as shown in FIG. 4 interengaged between the movable support 54 and the fixed rack 72. A hand wheel 74 is shown for rotation of the pinion 73, and thus the support member 54 moves to adjust the position of the gate 52 along the length of the conveyor 23 and relative to the transverse direction of the conveyor 47 to thereby align the bundle 10 with conveyor 47 and to center it therewith as desired.

FIG. 5 also shows the arrangement of the movable mounting member 54 and the rack 72 which is suitably fixed relative to the conveyor 23. FIG. 5 further shows the arrangement of the cylinder assembly 66 and its rod 67 and the connection through the rod end 76 with the upstanding fingers 68. FIGS. 3 and 5 also show a brake rod 77 which extends under certain ones of the rollers 51 and in the transfer area of the conveyor 23, which area was referred to above. That is, when one bundle 10 is being diverted to the branch 47, the trailing bundles 10 in the row moving along the conveyor 23 are held against movement, and this is accomplished by stopping the rotation of the conveyor rollers 51, and thus the brake 77 is employed. The brake 77 is in the form of a rod which is mounted on an arm 78 pivotally supported on a pivot point 79 on a frame piece 81. Thus the arm 77 can move upwardly into engagement with the lower surfaces of the approach rollers 51, and the extended end of the cylinder assembly rod 67 has an upstanding finger 82 which abuts the rod 77 to move it downwardly and away from engagement with the rollers 51 when it is desired to have the rollers 51 free to move in the conveyance of the bundles 10 supported thereon. However, when the rod 67 is retracted, then the brake rod 77 can move upwardly, under the influence of a tension spring 83 connected to the rod support arm 78 and to a frame piece 84. Therefore, the retraction of the piston rod 67 moves the finger 68 toward the conveyor 47 to take the first bundle 10 onto the conveyor 47, and, at the same time, the brake 77 is moved into contact with the approach rollers 51 and therefore the following bundles 10 cannot move into the transfer area until the cylinder 67 is again extended and the brake rod 77 is released.

The arrangement of the switches 31 and 58 and their connecting lines and controls may be similar, such as described in connection with the switch 58 and the cylinder assembly 66 which it controls, and thus the cylinder assembly of the cylinder 27 and piston rod 28 can be similarly arranged and controlled. Thus the operator can control the assembly 69, to divert the bundles 10 to any particular branch 47, since each branch 47 is arranged with the gate 52 and the brake mechanism and all described and shown in FIGS. 3, 4, and 5. Further, the operator can control a pivotally-mounted gate 86 which is at the end of the conveyor 47 and which pivots between the solid line horizontal position shown and the vertical dot-dash line position shown to thereby control the individual movement of the bundles 10 into the signature feeder apparatus 48. That is, tipping the gate 86 downwardly to the solid line position shown will permit the next bundle 10 to move to the leftward position shown in FIG. 6, and subsequently the bundle 10 can be placed in the dot-dash line position and moved into the unshown signature feeder, in the conventional manner. Also, when the gate 86 is tipped to the downward position, a roller brake 87 will be automatically actuated to prevent rotation of the rollers 57 and thereby preclude the movement of the remainder of the bundles 10 to the area of the gate 86 until the gate 86 is again tipped up to its dot-dash line position and this automatically releases the brake 87. The connection may be of any conventional arrangement, and a connector 88 is shown to extend between the gate 86 and the roller brake 87 for the action described.

Further, it will be understood by anyone skilled in the art that the complete method of depalletizing and moving the bundles from the prone position to the upstanding position and along the conveyors and branches thereof as described, all will be apparent. In this arrangement, the drawings show the pallet holder 13 to be pivotal about the shaft 14 which is disposed at least approximately at the juncture between the pallet legs 16 and 17, and the bundles are then dispensed to the bundle distribution conveyor which includes the conveyor 19 and conveyor 23 and the conveyor branches 47, all as described. Also, the apparatus has the bundle movement control mechanism which includes the gate 52 and the takeoff fingers 68 and also the brake member 77. Further, FIG. 2 shows that the conveyor 19 is of a width sufficient to support an entire row of six bundles 10, and the orientation of the direction of movement of the bundles along the pallet holder leg 17 and along the conveyors 19 and 23 are as described and shown and such that the bundles 10 move transverse relative to their previous movement on the pallet holder and the conveyor 19 when they reach the conveyor 23. Also, the bundle take-off or transverse movement mechanism of the assembly 66 and the fingers 68 are guides and guide mechanisms which control the movement of the bundles and which is located at the junction of each conveyor branch 47, such as seen in FIG. 7.

What is claimed is:

1. An automatic depalletizer for removing bundles of sheets from a pallet disposed in a horizontal position, comprising a pivotal pallet holder having two legs disposed at a right angle to each other and with said holder being pivotally mounted about an axis at the juncture of said two legs, one of said two legs being horizontally disposed and arranged to support a pallet with bundles of sheets thereon in a prone position, the other of said two legs being uprightly disposed and arranged to abut the pallet and the bundles of sheets thereon, whereby pivoting said holder about said axis positions said other leg in a horizontal position with the bundles thereon in an upstanding position, a conveyor disposed adjacent said holder at the side thereof adjacent said other leg, anti-friction members extending along said other leg for movement of the bundles of sheets off said other leg in a conveying direction and toward said converor whereby all of the bundles resting on said pallet before pivoting of said holder move along said anti-friction members and away from said pallet after pivoting of said holder, said conveyor being arranged with a width to receive a row of the bundles of sheets when the row is moved onto said conveyor from said other leg in the said conveying direction which is in the direction transverse to the length of said row, a second conveyor disposed adjacent the first-mentioned conveyor and being movable in the direction parallel to said width of said first-mentioned conveyor and disposed in communication therewith for receiving the bundles of sheets therefrom one row separately at a time for moving the bundles in the direction of the length of the row thereof, and branch conveyors disposed at spaced locations along said second conveyor and extending oblique to said second conveyor and in bundle movement communication therewith and extending to various locations for the delivery of the bundles of sheets to those locations.

2. The automatic depalletizer for removing bundles of sheets from a pallet disposed in a horizontal position as claimed in claim 1, including bundle movement control mechanisms operatively associated with said each of said conveyors for directing movement of the bundles of sheets relative to all said conveyors.

3. The automatic depalletizer for removing bundles of sheets from a pallet disposed in a horizontal position as claimed in claim 2, wherein said control mechanisms include gates movably disposed relative to said second conveyor and into and out of the path of movement of the bundles of sheets on said second conveyor for the metering of the movement of the bundles of sheets.

4. The automatic depalletizer for removing bundles of sheets from a pallet disposed in a horizontal position as claimed in claim 3, wherein said control mechanisms include brake mechanism movable into contact with said second conveyor for interrupting the movement of said bundles of sheets along said second conveyor.

5. The automatic depalletizer for removing bundles of sheets from a pallet disposed in a horizontal position as claimed in claim 3, including switches operatively associated with said movable gates and responsive to the movement of the bundles of sheets for activating said gates.

6. The automatic depalletizer for removing bundles of sheets from a pallet disposed in a horizontal position as claimed in claim 4, wherein said second conveyor is disposed at an angle declining to the horizontal and from said first-mentioned conveyor, for movement of the bundles of sheets under the force of gravity.

7. The automatic depalletizer for removing bundles of sheets from a pallet disposed in a horizontal position as claimed in claim 1, wherein said control mechanisms include abutment pieces on opposite ends of the row of bundles of sheets to hold a row against movement along said first-mentioned conveyor.

* * * * *